(12) United States Patent
Huynh-Ba

(10) Patent No.: US 9,309,433 B2
(45) Date of Patent: Apr. 12, 2016

(54) RADIATION AND CHEMICAL CURABLE COATING COMPOSITION

(75) Inventor: Gia Huynh-Ba, Hockessin, DE (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 819 days.

(21) Appl. No.: 12/746,530

(22) PCT Filed: Dec. 22, 2008

(86) PCT No.: PCT/US2008/087978
§ 371 (c)(1),
(2), (4) Date: Jun. 7, 2010

(87) PCT Pub. No.: WO2009/086285
PCT Pub. Date: Jul. 9, 2009

(65) Prior Publication Data
US 2010/0249263 A1   Sep. 30, 2010

Related U.S. Application Data

(60) Provisional application No. 61/009,402, filed on Dec. 28, 2007.

(51) Int. Cl.
| | | |
|---|---|---|
| *C09D 4/06* | (2006.01) | |
| *C09D 175/16* | (2006.01) | |
| *C08L 33/04* | (2006.01) | |
| *C09D 133/04* | (2006.01) | |
| *C08G 18/62* | (2006.01) | |
| *C08G 18/67* | (2006.01) | |
| *C08G 18/79* | (2006.01) | |
| *C08G 18/81* | (2006.01) | |
| *C09D 133/06* | (2006.01) | |
| *C09D 133/14* | (2006.01) | |
| *C08L 71/00* | (2006.01) | |
| *C08L 101/02* | (2006.01) | |

(52) U.S. Cl.
CPC .......... *C09D 133/04* (2013.01); *C08G 18/6229* (2013.01); *C08G 18/672* (2013.01); *C08G 18/792* (2013.01); *C08G 18/8175* (2013.01); *C09D 4/06* (2013.01); *C09D 133/06* (2013.01); *C09D 133/14* (2013.01); *C09D 175/16* (2013.01); *C08L 33/04* (2013.01); *C08L 71/00* (2013.01); *C08L 101/02* (2013.01); *C08L 2205/03* (2013.01)

(58) Field of Classification Search
CPC ....... C08L 33/04; C08L 71/00; C08L 101/02; C08L 2205/03; C09D 133/04; C09D 133/06; C09D 133/14; C09D 175/16; C09D 4/06; C08G 18/6229; C08G 18/672; C08G 18/792; C08G 18/8175
USPC .................... 522/126, 104; 524/556; 427/508
See application file for complete search history.

(56) References Cited

U.S. PATENT DOCUMENTS

| | | | |
|---|---|---|---|
| 6,087,413 | A | 7/2000 | Lake |
| 6,332,291 | B1 * | 12/2001 | Flosbach et al. ................ 522/91 |
| 6,815,501 | B2 | 11/2004 | Flosbach et al. |
| 2003/0018124 | A1 * | 1/2003 | Barsotti et al. .................. 525/64 |
| 2007/0197727 | A1 | 8/2007 | Lewin et al. |
| 2010/0168269 | A1 | 7/2010 | Huynh-Ba |

\* cited by examiner

*Primary Examiner* — Mark Eashoo
*Assistant Examiner* — Jessica Roswell
(74) *Attorney, Agent, or Firm* — Ingrassia Fisher & Lorenz, P.C.

(57) ABSTRACT

The disclosure relates to a coating composition comprising a component A comprising one or more acrylic polymers having one or more chemically crosslinkable functional groups X selected from hydroxyl, thiol, isocyanate, epoxy, acid, thioisocyanate, acetoacetoxy, carboxyl, amine, anhydride, ketimine, aldimine, or urethane group; and a component B comprising one or more monomers or oligomers having one or more functional groups Y that react with the functional groups X to form a crosslink and one or more radiation crosslinkable functional groups D which are radiation crosslinkable ethylenically unsaturated double bonds; wherein said functional groups X and Y are pair-wise selected from hydroxyl and isocyanate groups, thiol and isocyanate groups, epoxy and acid groups, epoxy and isocyanate groups, isocyanate and amine groups, or isocyanate and urethane groups. This disclosure is also directed to a method of using said coating composition to coat a substrate including a vehicle, a vehicle body or parts thereof.

19 Claims, No Drawings

RADIATION AND CHEMICAL CURABLE COATING COMPOSITION

CROSS REFERENCE OF RELATED APPLICATION

This application claims the benefit of International Patent Application No. PCT/US08/087978 filed on Dec. 22, 2008, which in turn claims the benefit of U.S. Provisional Application No. 61/009,402 filed Dec. 28, 2007 which is incorporated herein by reference in its entirety.

FIELD OF INVENTION

The present disclosure is directed to a coating composition that can be cured by radiation, chemical crosslinking or both radiation and chemical crosslinking. This disclosure is also directed to a method of using the radiation and chemically curable coating composition to coat a substrate.

BACKGROUND OF INVENTION

Coatings used during the repair of damaged automotive vehicles generally include several layers of different coating compositions. An initial coating is usually a primer coating resulting from a coating composition formulated as a primer with or without a sealer. The primer coating commonly contains pigments, fillers, or a combination thereof. Over the primer coating, a topcoating is applied which itself can result from more than one type of coating compositions, such as such as basecoat and clearcoat compositions. The coatings can be cured by different curing mechanisms, such as chemical crosslinking or radiation cure preferably by ultraviolet (UV) radiation. A coating curable by UV radiation typically contains UV curable double bond such as acrylic double bond. A coating curable by chemical crosslinking typically contains crosslinkable groups, such as hydroxyl groups, and corresponding crosslinking groups, such as isocyanate groups.

A coating that can only be cured by one curing mechanism is referred to as a mono-cure coating. Conventionally, a typical mono-cure coating composition that contains one or more components having acrylic double bonds can be cured by UV radiation in which the double bonds of the acrylic groups undergo polymerization to form a crosslinked network. A mono-cure coating is also known as 1K coating. U.S. Pat. No. 6,087,413, for example, discloses a mono-cure type UV curable clearcoat composition that can be completely cured by UV radiation to form a dry coating. A UV curable coating composition can usually have indefinite pot life until being sprayed and irradiated with UV light. Upon UV radiation, the UV curable coating can be cured to form a dry coating in very short period of time, typically within a few minutes. One of the disadvantages of mono-cure coating is that uneven or insufficient radiation may occur on a large coating area or in shaded areas. In the case of three-dimensional substrates of complicated geometry, for example automotive vehicle bodies, even and sufficient UV radiation is hard to achieve. To overcome that disadvantage, dual-cure coatings were developed.

A dual-cure coating is a coating that can be cured by two curing mechanisms, such as UV radiation and chemical crosslink. A dual-cure coating is also known as a 2K coating that are typically packaged in two separate containers. Typically, a dual-cure coating composition contains a first component having both radiation curable groups, such as acrylic double bonds, and chemical crosslinkable groups, such as hydroxyl, in one container. A second component contains a corresponding crosslinking agent having crosslinking groups, such as isocyanate groups and is stored in a second container. Just prior to use, the first component and the second component are mixed to form a pot mix. U.S. Pat. No. 6,815,501, for example, discloses a dual-cure type UV curable coating composition comprising double bonds and hydroxyl functional groups that can be cured by a combination of UV radiation and isocyanate crosslinking agents. A disadvantage of such dual-cure coating is that it requires both the crosslinking agent and UV radiation to form a dry coating. The use of the crosslinking agent, such as an isocyanate crosslinking agent, results in limited pot life of the pot mix losing the advantage of a UV mono-cure coating composition that can usually have indefinite pot life until being sprayed and irradiated with UV light.

In vehicle refinish repair systems compatibility of UV curable coating compositions for refinish with overlapping regions of original coating remaining on the substrate, including the original manufacturer (OEM) coating, can be a challenge. There is a need for a UV curable coating for refinish that is compatible with the overlapping regions of the existing coating formulation.

STATEMENT OF INVENTION

This invention is directed to a coating composition comprising:
 (i) a component A comprising one or more acrylic polymers having one or more chemically crosslinkable functional groups X selected from hydroxyl, thiol, isocyanate, epoxy, acid, thioisocyanate, acetoacetoxy, carboxyl, amine, anhydride, ketimine, aldimine, or urethane group;
 (ii) a component B comprising one or more monomers or oligomers having one or more functional groups Y that react with the functional groups X to form a crosslink and one or more radiation crosslinkable functional groups D;
 wherein a layer of said coating composition applied over a substrate cures into a dry coating when exposed to actinic radiation;
 wherein said one or more functional groups D are radiation crosslinkable ethylenically unsaturated double bonds;
 wherein said functional groups X and Y are pair wise selected from hydroxyl and isocyanate groups, thiol and isocyanate groups, epoxy and acid groups, epoxy and isocyanate groups, isocyanate and amine groups, or isocyanate and urethane groups.

The invention is additionally directed to a method of coating a substrate with the foregoing coating composition.

In one embodiment, the ratio of X to Y in said component A and said component B is greater than or equal to about 5 to about 1.

The functional groups X can be one or more hydroxyl groups and the functional groups Y can be one or more isocyanate groups.

The coating composition may additionally comprise a component C comprising one or more polyols which can be polyethylene glycol, polytetramethylene glycol, polytrimethylene ether diol, or a combination thereof.

The radiation crosslinkable ethylenically unsaturated double bonds can be selected independently from acrylate unsaturated double bond, methacrylate unsaturated double bond, or a combination thereof.

The coating composition can comprise one or more photoinitiators and can further comprise a catalyst, a rheology control agent, a pigment, a UV protection package, a flow additive, or a mixture thereof.

In one embodiment of the disclosure, the coating composition can be formulated as a one-package coating composition, additionally, the coating composition can further comprise a component E comprising one or more isocyanates having one or more isocyanate groups, and optionally a component C comprising one or more polyols, wherein the ratio of the hydroxyl groups and the isocyanate groups in said coating composition is in a range of from about 0.5 to about 1.5.

In another embodiment of the disclosure, the coating composition can be formulated as a two-package coating composition comprising a package I and a package II, wherein said package I comprises the component A and the component B, and optionally the component C, and wherein said package II comprises said component E, additionally, in the two-package coating composition the ratio of hydroxyl to isocyanate can be from about 0.5 to about 2.0.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "radiation", "irradiation" or "actinic radiation" means radiation that causes, in the presence of a photoinitiator, polymerization of monomers that have ethylenically unsaturated double bonds, such as acrylic or methacrylic double bonds. Sources of actinic radiation may be natural sunlight or artificial radiation sources. Examples of actinic radiation include, but not limited to, UV-A radiation, which falls within the wavelength range of from 320 nanometers (nm) to 400 nm; UV-B radiation, which is radiation having a wavelength falling in the range of from 280 nm to 320 nm; UV-C radiation, which is radiation having a wavelength falling in the range of from 100 nm to 280 nm; and UV-V radiation, which is radiation having a wavelength falling in the range of from 400 nm to 800 nm. Other examples of radiation can include electron-beam, also known as e-beam. Many artificial radiation sources emit a spectrum of radiation that contains UV radiation having wavelengths shorter than 320 nm. Actinic radiation of wavelengths shorter than 320 nm emits high energy and can cause damage to the skin and eyes. Radiations with longer wavelengths, such as UV-A or UV-V, emit lower energy and are considered safer than radiations with shorter wavelengths, such as UV-C or UV-B.

For a "two-pack coating composition", also known as 2K coating composition, typically two components are stored in separate containers and sealed to increase the shelf life of the components of the coating composition during storage. The components are mixed just prior to use to form a pot mix, which has a limited pot life, typically ranging from a few minutes (15 minutes to 45 minutes) to a few hours (4 hours to 8 hours). The pot mix is then applied as a layer of a desired thickness on a substrate surface, such as an automobile body. After application, the layer dries and cures at ambient or at elevated temperatures to form a coating on the substrate surface having desired coating properties, such as, high gloss, mar-resistance and resistance to environmental etching.

A pot life is a time period between the time when components of a coating composition are mixed to form a pot mix, referred to as time zero, and to the time when the pot mix becomes too thick or too hard for practical application. A pot life of a specific coating composition is a characteristic of that coating composition and is typically determined empirically. Pot life can be measured, for example, by the length of time required to double viscosity of the coating composition or pot mix using Zahn cup viscosity measurements. If after 24 hours, viscosity of a coating composition is not doubled, said coating composition can be referred to as having indefinite pot life.

Typically, a mono-cure or 1K coating composition, for example a UV mono-cure coating composition, can be prepared to form a pot mix and stored in a sealed container. As long as said UV mono-cure coating composition is not exposed to UV radiation, said UV mono-cure coating composition can have indefinite pot life.

For a dual cure or 2K coating composition, two components are typically stored separately and only mixed prior to use. Once the two components are mixed, the pot mix will have limited pot life, typically a few hours.

A "coated substrate" refers to a substrate covered with a coating, or multiple coatings. A coating or coatings can be a primer, a pigmented basecoat, a topcoat, or a clearcoat. The substrate can be covered by multiple layers of two different coatings, such as one or more layers of primers and one or more layers of pigmented basecoats as topcoats. The substrate can also be covered by multiple layers of at least three different coatings, such as one or more layers of primers, one or more layers of pigmented basecoats, and one or more layers of un-colored clearcoats. Examples of coated substrates can be a vehicle body or body parts coated with one or more monocolor paints, a vehicle body or body parts coated with one or more metallic paints, a bicycle body or body parts coated with one or more paints, a boat or boat parts coated with one or more paints, furniture or furniture parts coated with one or more paints, an airplane coated with one or more paints. The substrate can be made of metal, wood, plastic or other natural or synthetic materials.

As used herein "vehicle" includes an automobile, such as car, bus, truck, semi truck, pickup truck, SUV (Sports Utility Vehicle); tractor; motorcycle; trailer; ATV (all terrain vehicle); heavy duty mover, such as, bulldozer, mobile crane and earth mover; airplanes; boats; ships; and other modes of transport that are coated with coating compositions.

"Crosslinkable functional groups" are functional groups positioned in each molecule of compounds, oligomer, polymer, the backbone of the polymer, pendant from the backbone of the polymer, terminally positioned on the backbone of the polymer, or a combination thereof, wherein these functional groups are capable of crosslinking with the crosslinking functional groups (during the curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups defined below. A workable combination of crosslinkable functional groups refers to the combinations of crosslinkable functional groups that can be used in coating applications excluding those combinations that would self-crosslink.

"Crosslinking functional groups" are functional groups positioned in each molecule of monomer, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking group/crosslinkable functional group combinations would be excluded from the present invention, since they would fail to crosslink and produce the film forming crosslinked structures.

Typical crosslinking functional groups can be selected from the group consisting of hydroxyl, thiol, isocyanate, thioisocyanate, acid or polyacid, acetoacetoxy, carboxyl, primary amine, secondary amine, epoxy, anhydride, ketimine, aldimine. Some other functional groups such as orthoester, orther carbonate, or cyclic amide that can generate hydroxyl or amine groups once the ring structure is opened, can also be suitable as crosslinkable functional groups.

One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications.

It would be clear to one of ordinary skill in the art that certain crosslinking functional groups crosslink with certain crosslinkable functional groups. Examples of paired combinations of crosslinkable and crosslinking functional groups include: (1) ketimine crosslinking functional groups generally crosslink with acetoacetoxy, epoxy, or anhydride crosslinkable functional groups; (2) isocyanate, thioisocyanate and melamine crosslinking functional groups generally crosslink with hydroxyl, thiol, primary and secondary amine, ketimine, or aldimine crosslinkable functional groups; (3) epoxy crosslinking functional groups generally crosslink with carboxyl, primary and secondary amine, ketimine, or anhydride crosslinkable functional groups; (4) amine crosslinking functional groups generally crosslink with acetoacetoxy crosslinkable functional groups; (5) polyacid crosslinking functional groups generally crosslink with epoxy or isocyanate crosslinkable functional groups; (6) anhydride crosslinking functional groups generally crosslink with epoxy and ketimine crosslinkable functional groups; and (7) isocyanate crosslinking functional groups react with urethane crosslinkable functional groups to form allophanate.

Isocyanate functional groups can be present in polyisocyanates or oligomers, wherein said polyisocyanates or oligomers can have multiple isocyanate crosslinking functional groups, also known as crosslinking isocyanate functionalities. Typically, the polyisocyanates are provided within the range of 1 to 10, preferably 1 to 8, more preferably 2 to 5 isocyanate crosslinking functional groups. Some suitable polyisocyanates include aromatic, aliphatic, or cycloaliphatic polyisocyanates, trifunctional polyisocyanates and isocyanate functional adducts of a polyol and difunctional isocyanates. Some of the particular polyisocyanates include diisocyanates, such as 1,6-hexamethylene diisocyanate, isophorone diisocyanate, 4,4'-biphenylene diisocyanate, toluene diisocyanate, biscyclohexyl diisocyanate, tetramethyl-m-xylylene diisocyanate, ethyl ethylene diisocyanate, 1-methyltrimethylene diisocyanate, 1,3-phenylene diisocyanate, 1,5-napthalene diisocyanate, bis-(4-isocyanatocyclohexyl)-methane and 4,4'-diisocyanatodiphenyl ether.

Some of the suitable trifunctional polyisocyanates include triphenylmethane triisocyanate, 1,3,5-benzene triisocyanate, and 2,4,6-toluene triisocyanate. Trimers of diisocyanate, such as the trimer of hexamethylene diisocyanate sold under the trademark Desmodur® N3300A Polyisocyanate by Bayer Material Science LLC, of Pittsburgh, Pa., trimers of isophorone diisocyanate, both symmetric and asymmetric trimers, are also suitable. Furthermore, trifunctional adducts of triols and diisocyanates are also suitable. Trimers of diisocyanates are preferred and trimers of isophorone and hexamethylene diisocyanates are more preferred.

One or more photoinitiators and/or sensitizers that cause photopolymerization upon radiation can be included in an amount sufficient to obtain the desired cure response. Typically, the one or more photoinitiators are included in amounts of about 1% to about 15% by weight of the solid weight of a coating composition. As known to those skilled in the art, many photoinitiators can be suitable for the invention. These include, but not limited to, benzophenone, benzion, benzionmethyl ether, benzion-n-butyl ether, benzion-iso-butyl ether, propiophenone, acetophenone, methyphenylgloxylate, 1-hydroxycyclohexyl phenyl ketone, 2,2-diethoxyacetophenone, ethylphenylpyloxylate, diphenyl (2,4,6-trimethylbenzoyl)-phosphine oxide, phosphine oxide, phenyl bis(2,4,6-trimethyl benzoyl), phenanthraquinone, and a combination thereof. Other commercial photoinitiator products, or a combination thereof, such as Darocure® 1173, Darocure® MBF, Darocure®TPO or Irgacure® 184, Irgacure® 4265, Irgacure® 819, Irgacure® 2022 or Irgacure® 2100 from Ciba Co., are also suitable. Darocure® and Irgacure® are registered trademarks of Ciba Specialty Chemicals Corporation, New York.

A coating composition of this disclosure can optionally include a suitable inert solvent. Representatives of such solvents include ester solvents, e.g. ethyl acetate, or butyl acetate; ketone solvents, e.g. acetone, methylisobutylketone, or methylethylketone; alcohols, such as butyl alcohol; aromatic solvents, such as toluene or xylene; and ether solvent. Other solvent such as tert butylacetate, Oxsol®-100 (Oxsol® is a registered trademark of OCCIDENTAL CHEMICAL CORPORATION, NEW YORK), acetone, methylacetate, or a combination can also be used to reduce VOC (volatile organic compounds) level of the coating composition. The amount of solvent included in the coating composition will vary in accordance with the particular application at hand. For instance, for spray applications, higher levels of solvent will typically be included, while for roll applications, lower levels of inert solvent, if any, will be employed.

Additives such as light stabilizers, e.g. suitable hindered amines and/or benzotriazole derivatives, such as TINUVIN® 292 from Ciba can be used. UV absorbers, including without limit a liquid hydroxyphenyl-triazine UV absorber commercially available from Ciba (TINUVIN® 400) can be used. Other additives, such as low molecular weight polyacrylic for flow and leveling; polymeric silicone coating surface improvers; dyes; pigments; antioxidants; or flatting agents, such as wax-coated or non-wax-coated silica or other inorganic materials; can also be used. Commercially available flow additives, such as BYK® 301, BYK® 306, BYK® 331, BYK® 333, BYK® 325, BYK® 358, or BYK® 352 available from BYK-CHEMIE, Wallingford, Conn., can be included. BYK® is a registered trademark of BYK-CHEMIE, Wallingford, Conn.

The phrase "dry-to-touch" or "dry coating" means when the surface of a cured coating is touched with an object such as, a dry finger, gauze, or cotton swab, no visible marks appear on the surface. A "sticky" coating means the surface of that coating is not dry-to-touch and a mark is left on the coating when touched.

The phrase "tacky" means when the surface of a cured coating is touched with an object such as, a dry finger, gauze, or cotton swab, visible marks appear on the surface. The tacky layer may be fluid enough to flow and consequently heal, such that any visible marks on the surface of the tacky layer are no longer visible. Tackiness can be the consequence of a layer that has not fully cured and is thus not preferred in the refinish applications. Therefore, tacky material from the surface of a coating needs to be further cured or removed prior to sanding said coating layer or prior to applying subsequent coating layers over the tacky coating layer.

This disclosure is directed to a coating composition that can be cured to form a dry coating by UV radiation, chemical crosslink, or both the UV radiation and the chemical crosslink, said dry coating has a glass transition temperature (Tg) between 15° C. and 120° C., preferably between 25° C. and 100° C. The coating layer can be cured at ambient temperature which is typically in the range of about 20 to about 25° C.

The coating composition comprises a component A comprising an acrylic polymer having one or more chemically crosslinkable functional group X.

The acrylic polymer used in the composition has a weight average molecular weight of about 1,000 to 100,000, a Tg of 10 to 80° C. and contains pendant moieties that are reactive with isocyanate groups, such as, hydroxy, amino, amide, glycidyl, silane and carboxyl groups. The Tg can be measured or calculated according to the Fox Equation. Tg of the binder when cured is greater than 30° C. These acrylic polymers can be straight chain polymer, branched polymers, graft polymers, graft terpolymers and core shell polymers.

Preferably, the acrylic polymer has a weight average molecular weight of 5,000 to 50,000, more preferably, 8,000 to 25,000 and still more preferably, of 8,000 to 17,000. The acrylic polymer has a Tg, preferably of greater than 30° C. and up to 80° C. The Tg of the binder when cured is greater than 30° C. Typically useful acrylic polymers are those known in the art and are polymers of the following: linear alkyl (meth)acrylates having 1 to 12 carbon atoms in the alkyl group, cyclic or branched alkyl (meth)acrylates having 3 to 12 carbon atoms in the alkyl group, including isobornyl (meth) acrylate and the polymers can contain styrene, alpha methyl styrene, vinyl toluene, (meth)acrylonitrile, (meth)acryl amides and contain monomers that provide pendant reactive groups, like, hydroxy alkyl (meth)acrylates having 1 to 4 carbon atoms in the alkyl group, glycidyl (meth)acrylate, hydroxy amino alkyl (meth)acrylates having 1 to 4 carbon atoms in the alkyl group, (meth)acrylic acid, alkoxy silyl alkyl (meth)acrylates, such as, trimethoxysilylpropyl (meth) acrylate and the like.

Preferred are hydroxy functional acrylic polymers having a hydroxy equivalent weight (on a solids basis) of 200 to 1200, preferably, 380 to 750 and more preferably, 450 to 580 and are polymers of hydroxy alkyl (meth)acrylates and one or more of the aforementioned monomers. The hydroxyl equivalent weight is the grams of resin per equivalent of hydroxyl groups. The following are typically preferred acrylic polymers: styrene/methyl methacrylate/isobutyl methacrylate/ hydroxyethyl (meth)acrylate; styrene/methyl methacrylate/ isobutyl methacrylate/2-ethylhexyl methacrylate/isobornyl methacrylate/hydroxyethyl (meth)acrylate and styrene/ isobornyl methacrylate/2-ethylhexyl methacrylate/hydroxy propyl methacrylate/hydroxyethyl (meth)acrylate.

Suitable hydroxyl-functional unsaturated monomers that are used to introduce hydroxyl groups into the acrylic polymer are, for example, hydroxyalkyl esters of alpha,beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. The hydroxyalkyl esters of (meth)acrylic acid are preferred. Examples of suitable hydroxyalkyl esters of alpha,beta-olefinically unsaturated monocarboxylic acids with primary hydroxyl groups are hydroxyethyl (meth)acrylate, hydroxypropyl (meth)acrylate, hydroxybutyl (meth)acrylate, hydroxyamyl (meth)acrylate, hydroxyhexyl (meth)acrylate. Examples of suitable hydroxyalkyl esters with secondary hydroxyl groups are 2-hydroxypropyl (meth)acrylate, 2-hydroxybutyl (meth)acrylate, 3-hydroxybutyl (meth)acrylate.

Additional useful hydroxy-functional unsaturated monomers are reaction products of alpha,beta-unsaturated monocarboxylic acids with glycidyl esters of saturated monocarboxylic acids branched in alpha position, for example with glycidyl esters of saturated alpha-alkylalkanemonocarboxylic acids or alpha,alpha'-dialkylalkanemonocarboxylic acids. These preferably comprise the reaction products of (meth) acrylic acid with glycidyl esters of saturated alpha,alpha-dialkylalkanemonocarboxylic acids with 7 to 13 carbon atoms per molecule, particularly preferably with 9 to 11 carbon atoms per molecule. These reaction products may be formed before, during or after the copolymerization reaction.

Further usable hydroxy-functional unsaturated monomers are reaction products of hydroxyalkyl (meth)acrylates with lactones. Hydroxyalkyl (meth)acrylates which may be used are, for example, those stated above. Suitable lactones are, for example, those that have 3 to 15 carbon atoms in the ring, wherein the rings may also comprise different substituents. Preferred lactones are gamma-butyrolactone, delta-valerolactone, epsilon-caprolactone, beta-hydroxy-beta-methyl-delta-valerolactone, lambda-laurolactone or mixtures thereof. Epsilon-caprolactone is particularly preferred. The reaction products preferably comprise those prepared from 1 mole of a hydroxyalkyl ester of an alpha,beta-unsaturated monocarboxylic acid and 1 to 5 moles, preferably on average 2 moles, of a lactone. The hydroxyl groups of the hydroxyalkyl esters may be modified with the lactone before, during or after the copolymerization reaction.

Suitable unsaturated monomers that can be used to provide the acrylic polymer with carboxyl groups are, for example, olefinically unsaturated monocarboxylic acids, such as, for example, acrylic acid, methacrylic acid, crotonic acid, isocrotonic acid, itaconic acid. Acrylic acid and methacrylic acid are preferably used.

Suitable unsaturated monomers that can be used to provide the acrylic polymer with glycidyl groups are, for example, allyl glycidyl ether, 3,4-epoxy-1-vinylcyclohexane, epoxycyclohexyl (meth)acrylate, vinyl glycidyl ether and glycidyl (meth)acrylate. Glycidyl (meth)acrylate is preferably used.

Free-radically polymerizable, olefinically unsaturated monomers which, apart from at least one olefinic double bond, do not contain additional functional groups that can be used to form the acrylic polymer are, for example, esters of unsaturated carboxylic acids with aliphatic monohydric branched or unbranched as well as cyclic alcohols with 1 to 20 carbon atoms. The unsaturated carboxylic acids, which may be considered, are acrylic acid, methacrylic acid, crotonic acid and isocrotonic acid. Esters of (meth)acrylic acid are preferred. Examples of (meth)acrylic acid esters are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of (meth)acrylic acid esters with cyclic alcohols are cyclohexyl acrylate, trimethylcyclohexyl acrylate, 4-tert.-butylcyclohexyl acrylate, isobornyl acrylate and the corresponding methacrylates.

Further useful unsaturated monomers that do not contain additional functional groups are, for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers are styrene, alpha-methylstyrene, chlorostyrenes, 2,5-dimethylstyrene, p-methoxystyrene, vinyl toluene. Styrene is preferably used. Additional examples include, without limit, 1,6-hexanediol diacrylate commercially available from Sartomer Company under the product designation SR238B and trimethylolpropane triacrylate commercially available from Sartomer Company under the product designation SR-351.

Small proportions of olefinically polyunsaturated monomers may also be used. These are monomers having at least 2 free-radically polymerizable double bonds per molecule. Examples of these are divinylbenzene, 1,4-butanediol diacrylate, 1,6-hexanediol diacrylate, neopentyl glycol dimethacrylate, glycerol dimethacrylate.

The hydroxy-functional (meth)acrylic polymers generally are formed by free-radical copolymerization using conventional processes well known to those skilled in the art, for example, bulk, solution or bead polymerization, in particular by free-radical solution polymerization using free-radical initiators.

Acrylourethanes also can be used to form the novel coating composition of this invention. Typical useful acrylourethanes are formed by reacting the aforementioned acrylic polymers with an organic polyisocyanate. Generally, an excess of the acrylic polymer is used so that the resulting acrylourethane has terminal acrylic segments having reactive groups as described above. These acrylourethanes can have reactive end groups and/or pendant groups such as hydroxyl, carboxyl, amine, glycidyl, amide, silane or mixtures of such groups. Useful organic polyisocyanates are described hereinafter as the crosslinking component but also can be used to form acrylourethanes useful in this invention. Typically useful acrylourethanes are disclosed in Stamegna et al. U.S. Pat. No. 4,659,780, which is hereby incorporated by reference.

The acrylourethane can be an unsaturated aliphatic urethane acrylate. Suitable commercially available acrylourethanes are the Desmolux® line of unsaturated aliphatic urethane acrylates such as Desmolux® XP2654, 2513 and VP LS 2308 sold by Bayer MaterialScience.

The aliphatic urethane acrylate can be isocyanate-bearing a commercially available example is Desmolux® XP2510 sold by Bayer MaterialScience.

The acrylic polymer can contain (meth)acrylamides. Typical examples of such acrylic polymers are polymers of (meth) acrylamide and alkyl (meth)acrylates, hydroxy alkyl (meth) acrylates, (meth)acrylic acid and or one of the aforementioned ethylenically unsaturated polymerizable monomers.

The component B comprises one or more monomers or oligomers having one or more functional groups Y that react with the functional groups X to form a crosslink and one or more radiation crosslinkable functional groups D.

The functional group Y, hereafter referred to as the group Y, in the component B can react with the group X in the component A to form crosslinked structures resulting in a dry coating. The group Y can be selected from any of the aforementioned crosslinking or crosslinkable groups. It is understood that those skilled in the art can select pairs of the group X and the group Y to form desired crosslinked structures. For example, if the group X is a hydroxyl group or a thiol group, then the group Y should be selected from isocyanate groups, anhydride groups, or other hydroxyl or thiol reacting groups. In one example, the group X can be an isocyanate group while the group Y can be a hydroxyl or thiol group. In another example, the group Y can be an isocyanate group while the group X can be a hydroxyl or thiol group. Some of additional paired combinations include, but not limited to: (1) ketimine groups generally crosslinking with acetoacetoxy, epoxy, or anhydride groups; (2) isocyanate and melamine groups generally crosslinking with hydroxyl, thiol, primary and secondary amine, ketimine, or aldimine groups; (3) epoxy groups generally crosslinking with hydroxyl, carboxyl, primary and secondary amine, ketimine, or anhydride groups; (4) amine groups generally crosslinking with acetoacetoxy or isocyanate or epoxy groups; (5) acid or polyacid groups generally crosslinking with epoxy groups; and (6) anhydride groups generally crosslinking with epoxy or amine and ketimine groups.

A radiation crosslinkable functional group D, hereafter referred to as group D, can be one or more ethylenically unsaturated double bonds of monomers and/or oligomers that can undergo polymerization upon exposure to radiation. Examples of said monomers, or oligomers, can include, but are not limited to, $\alpha,\beta$-unsaturated carboxylic acid derivatives such as acrylic, methacrylic, acrylates, methacrylates, maleates, fumarates, maleimides, acrylamides, methacrylamide and oligomers derived from said $\alpha,\beta$-unsaturated carboxylic acid derivatives.

A UV cureable refinish repair coating composition made in accordance with this disclosure can be compatible with overlapping regions of coating formulations remaining on the substrate including the coating formulations from the original manufacturer.

One advantage of the coating composition of this disclosure is that the coating composition can have indefinite pot life as long as it is not exposed to actinic radiation, such as UV radiation, during storage while maintaining the ability to form a dry coating upon radiation alone. Another advantage is that the coatings can form dry coating film within 60 minutes, typically within 5-35 minutes after UV or other actinic radiation.

The coating composition of this invention can further comprise a component C comprising a polyol, such as polytrimethylene ether diol having a Mn (number average molecular weight) of 500 to 5,000.

Although the coating composition of this invention can be cured by actinic radiation alone to form a dry coating, it is desired that the coating composition can also be cured by chemical crosslinking or both radiation and chemical crosslinking. Such coating composition can be useful for large areas where radiation curing is difficult to achieve in a cost effective and timely fashion, or for shaded coating areas that UV radiation cannot reach.

The coating composition of this invention can comprise one or more aforementioned photoinitiators.

The coating composition of this invention can further comprise one or more catalysts for the reaction between the group X and Y, one or more rheology control agents, one or more pigments, UV protection package, flow additives, or a combination thereof, as known to those skilled in the art, to produce coatings with desired properties such as gloss, hardness, or color.

When the functional groups X in the component A are hydroxyl groups, the coating composition of this invention can further comprise a component E comprising one or more isocyanates having one or more isocyanate groups, wherein the ratio of the hydroxyl groups and the isocyanate groups in said coating composition is in a range of from 0.5 to 1.5.

The coating composition of this invention can be supplied in one package (1K) system having all components in one container or two package (2K) system having different components in two separate containers.

In one example for a 2K system, a first container (Package I) contains the acrylic polymer component A having hydroxyl groups as the group X, one or more photoinitiators, solvents, rheology control agents, with or without pigments, UV protection package such as UV absorber or light sensitizer, flow additives and other additives, and the component B comprising polyisocyanates having isocyanate groups as the group Y with or without catalyst. A second container (Package II) contains the component E comprising one or more isocyanates having one or more isocyanate groups. The 2K coating composition can be formulated in that the ratio of the hydroxyl groups and the isocyanate groups in said 2K coating composition is in a range of from 0.5 to 1.5.

In another 2K example, a first container (Package I) contains the acrylic polymer component A having hydroxyl groups as the group X, one or more photoinitiators, solvents, rheology control agents, one or more pigments, UV protection package, flow additives and other additives, the component B comprising polyisocyanates having isocyanate groups as the group Y with or without catalyst, and component C comprising a polyol, such as polytrimethylene ether diol having a Mn (number average molecular weight) of 500 to 5,000. A second container (Package II) contains the component E comprising one or more isocyanates having one or more isocyanate groups. The 2K coating composition can be formulated in that the ratio of the hydroxyl groups and the isocyanate groups in said 2K coating composition is in a range of from 0.5 to 1.5.

In one example for a 1K system, one container contains the acrylic polymer component A having isocyanate groups as the group X, and the component B comprising polymer having isocyanate-reactive groups such as hydroxyl groups as the group Y and radiation crosslinkable ethylenically unsaturated double bonds as the group D with or without catalyst. The ratio of X to Y in the system is greater than or equal to 5:1. Such 1K system can be used to produce a coating that can be cured by radiation, such as UV radiation.

In yet another 1K example, one container contains the acrylic polymer component A having hydroxyl groups as the group X, isocyanate-bearing aliphatic urethane acrylate comprising isocyanate groups as the group Y and acrylic double bonds as the group D and optionally the catalyst. The ratio of X to Y in the system is greater than or equal to 5:1. Such 1K system can be used to produce a coating that can be cured by radiation, such as UV radiation.

In yet another 1K example, one container contains the acrylic polymer component A comprising hydroxyl groups as the group X, isocyanate-bearing aliphatic urethane acrylate comprising isocyanate groups as the group Y and acrylic double bonds as the group D, component C comprising a polyol, such as polytrimethylene ether diol having a Mn (number average molecular weight) of 500 to 5,000, and optionally one or more catalysts. The ratio of X to Y in the system is greater than or equal to 5:1. Such 1K system can be used to produce a coating that can be cured by radiation, such as UV radiation.

It is known to those skilled in the art that certain additives may not be stored in the same container containing certain reactive components such as isocyanates. Those additives can be added to the coating composition immediately prior to applying the coating to a substrate.

One advantage of this disclosure is that when an area of a substrate expected to be coated with the coating composition can be readily irradiated with even radiation in a short period of time, such as a few minutes of UV lamp radiation, a coating technician can choose to only use a portion of the Package I. The rest of the Package I can be kept in the first container for later use without being wasted since the Package I can have indefinite pot life if not exposed to UV radiation. When a large area of a substrate is expected to be coated, or some parts of the substrate are shaded and not reachable by a UV lamp radiation, the coating technician can choose to add Package II from the second container so the entire coated area can be cured to form a dry coating with or optionally without the UV irradiation. The coating composition of this disclosure provides flexibility for coating a substrate in various situations without the need to test a different coating composition. Traditional mono-cure and dual-cure coating compositions lack such flexibility.

Additionally, the coating composition of this disclosure adheres to the clearcoat provided by the original equipment manufacturer.

The coating composition of this disclosure can be formulated for the use as a clearcoat, a topcoat, a primer, a sealer, or a basecoat.

This disclosure is also directed to a method for coating a substrate. In one embodiment, said method comprises the following steps.

In step a), a coating composition is selected. The coating composition can be selected from: a one-package (1K) coating composition or a two-package (2K) coating composition.

The 1K coating composition comprises a package I comprising (i) a component A comprising an acrylic polymer having one or more chemically crosslinkable functional groups X selected from the group consisting of hydroxyl, isocyanate, epoxy, acid, thioisocyanate, acetoacetoxy, carboxyl, amine, anhydride, ketimine, aldimine, urethane group, and a workable combination thereof; and (ii) a component B comprising one or more monomers, or oligomers, having one or more functional groups Y that react with the functional groups X to crosslink and one or more functional groups D which are actinic radiation crosslinkable ethylenically unsaturated double bonds. Said functional groups X and Y can be pair-wise selected from hydroxyl and isocyanate groups, epoxy and acid groups, epoxy and isocyanate groups, isocyanate and amine groups, isocyanate and urethane groups, or other aforementioned paired combinations of the crosslinking and crosslinkable functional groups. In said package I, the ration of X to Y in said component A and said component B is greater than or equal to about 5 to about 1.

The 2K coating composition comprises the package I and a package II. The package II can comprise a component E. When the group X is hydroxyl group, the component E can comprise isocyanates having one or more isocyanate functional groups. The 2K coating composition can be formulated such that the final ratio of the hydroxyl groups and the isocyanate groups in mixed said 2K coating composition is in a range of from 0.5 to 1.5.

When the substrate to be coated is of small size and simple geometry that can be radiated with a UV lamp evenly in short period of time, the 1K coating composition can be selected and applied to the substrate. When the substrate to be coating is of large size or in complex geometry so it cannot be easily radiated with a UV lamp or requires extended period of UV exposure, then the 2K coating composition can be selected. Such 2K coating composition can have a package I comprising the component A and a package II that comprises the component B. The package I and the package II can be formulated so that certain volumes of the package I and II can be easily mixed. In one example, four volumes of the package I and one volume of the package II can be mixed to form the 2K coating composition. The package I and II can be mixed in a container just before spraying coating application.

In step b), the selected coating composition can be applied to the substrate to form a coating layer. Conventional coating application techniques known to those skilled in the art, such as spraying, brushing, dipping, or rolling can be suited for this invention.

In step c), the coating layer is irradiated with actinic radiation to form a dry coating on said substrate. For example, UV radiation can be provided with a UV lamp or a UV flash lamp. The UV radiation can be provided at a specific wavelength or a range of wavelengths, such as UV-A, UV-B, UV-C, UV-V or a mixture thereof. UV radiation can also be provided for specific time duration, such as in a range of from a few seconds to a few minutes; or at specific intensity and power to cause curing of the coating composition. Those skilled in the art can select specific UV lamp or UV filters to produce desired UV radiations. For example, a high pressure mercury lamp can be suitable for this invention. If desired, temperature can also be modified by those skilled in the art.

The method of this disclosure can have an optional step d) to further cure the coating layer at ambient temperatures, such as the temperatures that are generally considered as room temperatures such as from about 18° C. to about 23° C., if a two-package (2K) coating composition is selected.

Another advantage of this disclosure is that the package II can be mixed with the package I in an "on-demand" fashion during spraying application. In one example, both the package I and the package II can be supplied to a spray gun through separate controls, such as individual containers, tubes, valves or switches. The controls can be configured so the package I can be continuously sprayed onto the substrate to form a coating layer and the package II can be mixed with the package I when so desired. For example, when spray coating a mirror casing of a vehicle, a painter can use the package I for most of the casing surface that can be readily exposed to UV light. For parts of the casing surface that are in shaded areas not readily exposed to UV light, the painter can open the control to allow the package II being mixed with the package I. The coating layer in the shaded areas, formed by the mixed package I and II, can be readily cured through crosslink reaction between the crosslinkable and the crosslinking groups in the coating composition even with limited or optionally without UV radiation.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions. All ingredients are in grams. All percentages are weight percentage unless specified otherwise.

Polymer 1

A hydroxyl-containing acrylic polymer solution was prepared by charging the ingredients listed in Table 1 into a reactor equipped with a thermocouple, a heating mantle, a mechanical stirrer, addition funnel, nitrogen purge and a reflux condenser.

Portion 1 was added to the reactor and heated to its reflux temperature. Portions 2 and 3 were then added together at a uniform rate to the reactor over a three hour period while the resulting reaction mixture was maintained at its reflux temperature. The reaction mixture was held at reflux for an additional hour. The resulting polymer solution ("Polymer 1") had a polymer solids content of about 60%. The polymer had an $M_w$ of about 8,500 and a $T_g$ of about 55° C.

TABLE 1

|  | Parts by Weight |
|---|---|
| Portion 1 | |
| Xylene | 55 |
| Portion 2 | |
| Methyl ethyl ketone | 10 |
| Styrene monomer | 15 |
| Methyl methacrylate monomer | 5 |
| Isobutyl methacrylate monomer | 32 |
| Isobornyl methacrylate monomer | 23 |
| 2-ethyl hexyl methacrylate monomer | 5 |
| Hydroxy ethyl methacrylate monomer | 20 |
| Portion 3 | |
| t-butyl peracetate solution (75% solids in mineral spirits | 2.5 |
| Total | 167.5 |

Polymer 2

A hydroxyl-containing acrylic polymer solution was prepared by the same procedure described for Polymer 1 except that the ingredients listed in Table 2 were used. The resulting polymer solution ("Polymer 2") had a polymer solids content of about 60%. The polymer had an $M_w$ of about 10,500 and a Tg of about 58° C.

TABLE 2

|  | Parts by Weight |
|---|---|
| Portion 1 | |
| Xylene | 57 |
| Portion 2 | |
| Methyl ethyl ketone | 10 |
| Styrene monomer | 15 |
| Isobutyl methacrylate monomer | 45 |
| Methyl methacrylate monomer | 20 |
| Hydroxy ethyl methacrylate monomer | 20 |
| Portion 3 | |
| T-butyl peracetate solution (75% solids in mineral spirits) | 3.0 |
| Total | 170 |

Test Procedures

X-Hatch or Grid Test Procedure: The cross hatch tape test (also referred to as the Grid Test) is primarily intended for use in the laboratory on coatings less than 5 mils (125 microns) thick. It uses a cross-hatch pattern. A cutting guide or a special cross-hatch cutter with multiple preset blades is needed to make sure the incisions are properly spaced and parallel. For X-hatch test, two cuts are made into the coating with a 30-45 degree angle and down to the substrate which intersects to form an "X". X-hatch test is generally less severe than the Grid test. After the tape has been applied and pulled off, the cut area is then inspected and rated. The foregoing tests are based on a standard method for the application and performance of these adhesion tests available in ASTM D3359 B. For the purposes of this invention, the adhesion is rated on a sliding scale, which ranges from 0 (no adhesion, i.e., total failure) to 10 (complete adhesion, i.e., total success). A rating of 6 and higher is preferable and a rating of 9 and higher is more preferable. The adhesion times used in the test were 90 minutes, 1 hour, 2 hours or 1 day.

A device described in U.S. Patent Publication No. 2006/0042724, published on Mar. 2, 2006, filed on Jun. 16, 2005 with an application Ser. No. 11/154,487, can be used to create properly spaced and parallel incisions into the coating.

Fischer Hardness Test: the Fischer Hardness Test was performed using FISCHERSCOPE® machine from Helmut FISCHER Co. GMBH; 7032 Sudelfingen, Germany. The measurement from the FISCHERSCOPE® is in Newtons per square millimeter (N/mm$^2$). The higher the hardness value, the harder is the coating film. FISCHERSCOPE® is a registered trademark of Helmut Fischer GmbH & Co., Sindelfingen, GERMANY.

DOI (Distinct of Image): DOI can be measured according to ASTM E430-97.

Gloss can be measured according to ASTM D523-39. Typically, a value of 100 represents high gloss.

Examples 1-7

In these examples coating compositions were prepared from Polymer 1. Table 3 provides a list of the ingredients used in the coating compositions of these Examples.

TABLE 3

| Ingredient | Product Designation | Supplier |
|---|---|---|
| Unsaturated Aliphatic Urethane Acrylate 60% solids in n-butyl acetate | Desmolux ® XP 2654 UV cure resin | Bayer Material Science, Pittsburgh, PA |
| Unsaturated Aliphatic Urethane Acrylate without thinner | Desmolux ® 2513 UV cure resin | Bayer Material Science, Pittsburgh, PA |
| Unsaturated Aliphatic Urethane Acrylate | Desmolux ® VP LS2308 UV cure resin | Bayer Material Science, Pittsburgh, PA |
| Isocyanate-bearing Aliphatic Urethane Acrylate | Desmolux ® XP 2510 UV cure resin | Bayer Material Science, Pittsburgh, PA |
| Trimethylolpropane Triacrylate | SR-351 monomer | Sartomer Company, Inc., Exton, PA |
| 1,6-hexanediol diacrylate | SR238B monomer | Sartomer Company, Inc., Exton, PA |
| Isobornyl acrylate | monomer | Aldrich Chemical Company, Milwaukee, Wisconsin |
| Flow additive: Polyether modified polydimethylsiloxane | BYK-333 | BYK-Chemie, a member of Altana Chemie, Wesel, Germany |
| Leveling agent (Flow additive) | BYK-358 | BYK-Chemie, a member of Altana Chemie, Wesel, Germany |
| Liquid UV absorber | TINUVIN ® 384 | Ciba Specialty Chemicals, Inc. Basel, Switzerland |
| UV absorber: Liquid hydroxyphenyl-triazine | Tinuvin ® 400 UV absorber | Ciba Specialty Chemicals, Inc. Basel, Switzerland |
| Photoinitiator: 2,4,6-Trimethylbenzoyl-diphenyl-phosphineoxide | Darocur ® TPO photoinitiator | Ciba Specialty Chemicals, Inc. Basel, Switzerland |
| Mixture of Bis (1,2,2,3,3-pentamethyl-4-piperidyl) sebacate (MW 509) and methyl 1,2,2,6,6-pentamethyl-4-piperidyl sebacate (MW370) | Tinuvin ® 292 hindered amine light stabilizer | Ciba Specialty Chemicals, Inc. Basel, Switzerland |
| Isocyanate trimer of hexamethylene diisocyanate | Desmodur ® 3300 | Bayer Material Science Pittsburg, PA |

The coating compositions of Examples 1-6 were prepared according to the ingredients and amounts of Table 4. The coatings of Examples 1-6 were individually spray coated on separate substrates that already had original OEM coating. The coatings of Example 1-6 formed dry film after UV radiation. Adhesion of the dried film was tested in accordance with the grid test and the results are reported in Table 5.

TABLE 4

| | Example # | | | | | |
|---|---|---|---|---|---|---|
| | 1 | 2 | 3 | 4 | 5 | 6 |
| Polymer 1 (including solvent) | 0 | 49.2 | 49.2 | 49.2 | 74.59 | 68.85 |
| Unsaturated Aliphatic Urethane Acrylate 60% solids in n-butyl acetate (XP2654) | 48.33 | 11.67 | 11.67 | 23.33 | 0 | 0 |
| Unsaturated Aliphatic Urethane Acrylate without thinner (XP2513) | 29 | 16 | 16 | 26 | 21.3 | 21.3 |
| Unsaturated Aliphatic Urethane Acrylate (LS2308) | 37 | 27 | 22 | 0 | 21.3 | 21.3 |
| Isocyanate-bearing Aliphatic Urethane Acrylate (XP2510) | 0 | 0 | 0 | 0 | 2.4 | 2.2 |
| Trimethylolpropane Triacrylate (SR351) | 0 | 20 | 20 | 20 | 9.6 | 8.8 |
| 1,6-hexanediol diacrylate (SR238B) | 5 | 0 | 5 | 10 | | |
| Isobornyl acrylate | 0 | 0 | 0 | 0 | 0 | 4.4 |
| Leveling aid (BYK-358) | 0.3 | 0 | 0 | 0 | 0.6 | 0.6 |
| Flow additive (BYK-333) | 0 | 1 | 1 | 1 | 0 | 0 |
| UV absorber (Tinuvin 384) | 0.5 | 0 | 0 | 0 | 1 | 1 |
| Light stabilizer (Tinuvin 292) | 0.5 | 0.5 | 0.5 | 0.5 | 1 | 1 |
| Photoinitiator (TPO) | 0.6 | 0 | 0 | 0 | 0 | 0 |
| Photoinitiator (184) | 5.4 | 6 | 6 | 6 | 6 | 6 |
| UV absorber (Tinuvin 400) | 0 | 0.5 | 0.5 | 0.5 | 0 | 0 |
| Butyl acetate free Add | 73.37 | 68.14 | 68.14 | 63.47 | 62.21 | 64.55 |
| Subtotal binder solids and solvents | 200 | 200 | 200 | 200 | 200 | 200 |
| Subtotal binder solids | 100 | 100 | 100 | 100 | 100 | 100 |
| NCO/OH Ratio | <0.05 | <0.05 | <0.05 | <0.05 | 0.05 | 0.05 |
| Solids of Polymer 1 | 0 | 30.01 | 30.01 | 30.01 | 45.50 | 42.00 |
| Solids of XP-2654 | 29 | 7 | 7 | 14 | 0 | 0 |
| Grid Test (10 = best, 0 = worst): | | | | | | |
| 1-2 hours Grid Test Score & Failure location* | 0 OEM/CC | 9 OEM/CC | 9.3 OEM/CC | 8 OEM/CC | 10 None | 9.7 OEM/CC |
| 1 Day Grid Score & Failure location | | | | | 10 None | 9.9 None |
| X Hatch Test: | | | | | | |
| 1 hour X-Hatch Score | 2 | | | | | |

*Note: OEM/CC means that failure was observed at the overlapping area between the original OEM coating and the clearcoat from the examples.

1K Coating System

A 1K coating system was prepared in Example 7 according to the ingredients and amounts of Table 5. The resulting 1K coating system had ready to spray solids 50%, Polymer 1 solids 30%, Sartomer SR351 solids 20%, Desmophen VP LS-2308 solids 21.6%, XP2513 solids 16%, XP2654 solids 7%, HDDA solids 0%, NCO:OH ratio less than 0.1 and same day viscosity 15.6 using Zahn #2 cup.

The 1K system was spray coated onto a surface which already had the original OEM black coating. The 1K system formed a dry film after UV radiation for 9 minutes, wherein the UV lamp was 6 inches away from the surface.

TABLE 5

| | Example # 7 |
|---|---|
| Polymer 1 (including solvent) | 49.180 |
| Trimethylolpropane Triacrylate (SR351) | 20.000 |
| Unsaturated aliphatic urethane acrylate (80% solids in 20% HDDA[1]) | 27.000 |
| Unsaturated Aliphatic Urethane Acrylate without thinner (XP2513) | 16.000 |
| Unsaturated Aliphatic Urethane Acrylate 60% solids in n-butyl acetate (XP2654) | 11.667 |
| 2,4,6-Trimethyl benzoyl-diphenyl-phosphineoxide (Darocur ® TPO) | 7.000 |
| Butyl acetate | 67.153 |

TABLE 5-continued

| | Example # 7 |
|---|---|
| Liquid hydroxyphenyl-triazine (Tinuvin ® 400) | 0.500 |
| Liquid hindered amine light stabilizer (Tinuvin ® 292) | 0.500 |
| Polyether modified polydimethylsiloxane (BYK-333) | 1.000 |
| Subtotal | 200 |
| Solids (%) | 50 |

[1] HDDA is hexanedioldiacrylate.

The adhesion of the dried film made from the coating composition of Example 7 was tested in accordance with the grid test, hardness test, DOI (Distinct of Image) and Gloss test. Results for the 1K coating system are reported in Table 6.

TABLE 6

Coating Properties of 1K Coating System

| | Example # 7 |
|---|---|
| Adhesion X-hatch tested on same day as coating | 10 |
| Film Build (mil) | 2.5 |
| Fischer hardness (same day) N/mm$^2$ | 121 |
| Fischer hardness (14 days) N/mm$^2$ | 128 |
| DOI (Distinct of Image) after 14 days | 98 |
| Gloss 14 days | 87 |

2K Coating System

To formulate a 2K system, the composition of Example 7 (Table 5) was packaged as a Package I. The composition of a Package II is shown in Table 7. The 2K coating system was prepared by mixing 25 grams of the Package I with 6 grams of the Package II (Table 7). Mixing ratio between the Package I and the Package II was about 4 to 1.

TABLE 7

Package II for 2K System

| Ingredients | Amount (%) |
|---|---|
| Isocyanate trimer of hexamethylene diisocyanate (Desmodur ® 3300) | 37 |
| Butyl acetate | 63 |
| SUB TOTAL | 100 |

The resulting 2K coating system was sprayed on to a substrate at 76° F. and 56% relative humidity (RH). The coating property results for the 2K coating system are reported in Table 8.

TABLE 8

Coating Properties of 2K Coating System

| Example | 2K System: Package I:Package II = 4:1 |
|---|---|
| Grid Test Score (1.5 hours at ambient temperature) | 10 |
| Film Build in mil | 2.2 |
| Fischer hardness after 1 day (N/m$^2$) | 93 |

TABLE 8-continued

Coating Properties of 2K Coating System

| Example | 2K System: Package I:Package II = 4:1 |
|---|---|
| Fischer hardness after 13 days (N/mm$^2$) | 128 |
| DOI after 13 days at 75° F./63% RH | 98 |
| Gloss after 13 days | 89 |

What is claimed is:

1. A coating composition comprising a mixture of:
   (i) a component A comprising one or more acrylic polymers having one or more chemically crosslinkable functional groups X selected from the group consisting of: hydroxyl, thiol, isocyanate, epoxy, acid, thioisocyanate, acetoacetoxy, carboxyl, amine, anhydride, ketimine, aldimine, and urethane group; and
   (ii) a component B comprising one or more monomers or oligomers having one or more functional groups Y that react with one or more of the functional groups X to form a crosslink and one or more radiation crosslinkable functional groups D which are radiation crosslinkable ethylenically unsaturated double bonds;
   wherein the mixture is present as a sprayable liquid prior to application of the mixture to a substrate and prior to exposure to actinic radiation, wherein the mixture remains as the sprayable liquid indefinitely until exposure to actinic radiation, and wherein a layer of said coating composition applied over the substrate cures into a dry coating when exposed to actinic radiation;
   wherein one or more of said functional groups X and Y are pair-wise selected from: a hydroxyl group and an isocyanate group, a thiol group and an isocyanate group, an epoxy group and an acid group, an epoxy group and an isocyanate group, an isocyanate group and an amine group, and an isocyanate group and a urethane group;
   wherein the ratio of X to Y in said component A and said component B is greater than or equal to 5 to 1.

2. The coating composition of claim 1, wherein the radiation crosslinkable ethylenically unsaturated double bonds are selected independently from the group consisting of acrylate unsaturated double bond, methacrylate unsaturated double bond, and a combination thereof.

3. The coating composition of claim 1, wherein said coating composition is formulated as a one-package coating composition.

4. The coating composition of claim 1, wherein the functional groups X are one or more hydroxyl groups and the functional groups Y are one or more isocyanate groups.

5. The coating composition of claim 1, wherein said coating composition is formulated as a two-package coating composition comprising a package I and a package II, wherein said package I comprises the component A and the component B, and wherein said package II comprises a component E, wherein component E comprises one or more additives selected from one or more isocyanates having one or more isocyanate groups, one or more photoinitiators, a catalyst, a rheology control agent, a pigment, a UV absorber, a light stabilizer, a flow additive, and a mixture of two or more thereof.

6. A method for coating a substrate comprising the steps of:
   (a) providing a coating composition, wherein said coating composition comprises a mixture of:
      (i) a component A comprising one or more acrylic polymers having one or more chemically crosslinkable functional groups X selected from the group consisting of hydroxyl, thiol, isocyanate, epoxy, acid, thioisocyanate, acetoacetoxy, carboxyl, amine, anhydride, ketimine, aldimine, and urethane group; and (ii) a component B comprising one or more monomers or oligomers having one or more functional groups Y that react with one or more of the functional groups X to form a crosslink and one or more radiation crosslinkable functional groups D which are radiation crosslinkable ethylenically unsaturated double bonds;

wherein the mixture is present as a sprayable liquid prior to application of the mixture to a substrate and prior to exposure to actinic radiation, wherein the mixture remains as the sprayable liquid indefinitely until exposure to actinic radiation, and wherein a layer of said coating composition applied over the substrate cures into a dry coating when exposed to actinic radiation;

wherein one or more of said functional groups X and Y are pair-wise selected from a hydroxyl group and an isocyanate group, a thiol group and an isocyanate group, an epoxy group and an acid group, an epoxy group and an isocyanate group, an isocyanate group and an amine group, and an isocyanate group and a urethane group;

wherein the ratio of X to Y in said component A and said component B is greater than or equal to 5 to 1;

b) applying the coating composition to the substrate to form a coating layer; and c) irradiating the coating layer with actinic radiation to form a dry coating on said substrate.

7. The method of claim 6 further comprising the step d) curing the coating layer at ambient temperatures.

8. The method of claim 6, wherein said coating composition further comprises a component C comprising one or more polyols selected from the group consisting of polyethylene glycol, polytetramethylene glycol, polytrimethylene ether diol, and a combination thereof.

9. The method of claim 6, wherein the radiation crosslinkable ethylenically unsaturated double bonds are selected independently from an acrylate unsaturated double bond, a methacrylate unsaturated double bond, and a combination thereof.

10. The method of claim 6, wherein said coating composition is provided as a one-package coating composition.

11. The method of claim 6, wherein the functional groups X are one or more hydroxyl groups and the functional groups Y are one or more isocyanate groups.

12. The method of claim 11, wherein the coating composition further comprises a component E comprising one or more isocyanates having one or more isocyanate groups, wherein the ratio of the hydroxyl groups to the isocyanate groups in said coating composition is in a range of from about 0.5 to about 1.5.

13. The method of claim 12, wherein said coating composition is provided as a two-package coating composition comprising a package I and a package II, wherein said package I comprises said component A, said component B and the package II comprises said component E.

14. The method of claim 13 further comprising the step of mixing the package I and the package II.

15. The coating composition of claim 1, wherein the acrylic polymer of component A has a weight average molecular weight of about 1,000 to about 100,000.

16. The coating composition of claim 15, wherein the acrylic polymer of component A has a weight average molecular weight of about 8,000 to about 17,000.

17. The coating composition of claim 1, wherein the acrylic polymer of component A has a Tg of greater than 30° C. and up to 80° C.

18. The coating composition of claim 1, wherein the ratio of X to Y in said component A and said component B is greater than 10 to 1.

19. The coating composition of claim 18, wherein the ratio of X to Y in said component A and said component B is greater than 20 to 1.

* * * * *